(12) United States Patent
Takahashi et al.

(10) Patent No.: US 6,549,743 B2
(45) Date of Patent: Apr. 15, 2003

(54) IMAGE READING DEVICE

(75) Inventors: Takuji Takahashi, Yokohama (JP); Yoshiaki Nagao, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/050,945

(22) Filed: Jan. 22, 2002

(65) Prior Publication Data

US 2002/0114645 A1 Aug. 22, 2002

(30) Foreign Application Priority Data

Jan. 22, 2001 (JP) ........................................ 2001-013648

(51) Int. Cl.[7] ...................... G03G 15/04; G03G 15/28; G03G 15/30
(52) U.S. Cl. ...................... 399/211; 399/88; 399/220
(58) Field of Search .............................. 399/88, 90, 211, 399/212, 220; 358/497

(56) References Cited

U.S. PATENT DOCUMENTS 4,965,638 A * 10/1990 Hediger ...................... 399/211
5,038,028 A * 8/1991 Boyd et al. ................. 399/211
5,991,570 A   11/1999 Haga et al.

* cited by examiner

*Primary Examiner*—Hoang Ngo
(74) *Attorney, Agent, or Firm*—Oblon, Spivak, McClelland, Maier & Neustadt, P.C.

(57) ABSTRACT

An image reading device includes a feeding cable which connects a voltage applying part and a light source, and includes a conductive cable with an outer circumference covered with an insulating film. A first portion at one end side of the feeding cable is held by a first feeding cable holding member fixedly arranged in a vicinity of the voltage applying part. A second portion at the other end side of the feeding cable is held by a second feeding cable holding member attached to a first moving carriage that carries a light source and a first mirror. A portion of the feeding cable between the first and second feeding cable holding members is wound around a pulley in a U-shape. The pulley moves integrally with a second moving carriage that carries second and third mirrors.

24 Claims, 5 Drawing Sheets

IMAGE READING DEVICE

CROSS-REFERENCE TO RELATED APPLICATION

This document claims priority and contains subject matter related to Japanese Patent Application No. 2001-013648 filed in the Japanese Patent Office on Jan. 22, 2001, and the entire contents of each of which are hereby incorporated herein by reference.

BACKGROUND OF THE INVENTION

1. Field of the Invention

The present invention relates generally to an image reading device, and more particularly to first and second moving carriages that move in parallel with a contact glass on which an original document is set for reading an image of the original document.

2. Discussion of the Background

An image reading device employed in a copying machine, a facsimile machine, or other similar image forming apparatus, may include first and second moving carriages that move in the same direction at a speed ratio of two to one, in parallel with a contact glass on which an original document is set.

The first moving carriage carries a light source that irradiates an image surface of an original document with light and a first mirror that reflects the light reflected from the image surface of the original document. The second moving carriage carries at least one of a second mirror and a third mirror that reflects the light reflected from the first mirror.

In this type of the image reading device, voltage is applied to the light source from a voltage applying part such as a regulator at a time of image reading. The voltage is applied to the light source through a flexible wiring board connecting the voltage applying part and the light source. Because a flexible wiring board is a relatively expensive part, a manufacturing cost of the image reading device typically increases by use of a flexible wiring board.

The inventors of the present invention realized, as an alternative to a flexible wiring board, a relatively cheap feeding cable including a conductive cable with an outer circumference covered with an insulating film is used, thereby decreasing a manufacturing cost of an image reading device. In a case of using a feeding cable, there may be problems such as a twist in the feeding cable, a tangle of the feeding cable due to a crossing, and a wear of the insulating film due to rubbing against other members.

SUMMARY OF THE INVENTION

According to one aspect of the present invention, an image reading device includes a first moving carriage configured to carry a light source that irradiates an image surface of an original document with light and a first mirror that reflects the light reflected from the image surface of the original document, a second moving carriage configured to carry at least one of a second mirror and a third mirror that reflects the light reflected from the first mirror, a voltage applying part configured to apply voltage to the light source, and a feeding cable connecting the voltage applying part and the light source. The feeding cable includes a conductive cable whose outer circumference is covered with an insulating film. The image reading device further includes a first feeding cable holding member fixedly arranged in a vicinity of the voltage applying part at a position along a moving direction of the first and second moving carriages to hold a first portion of the feeding cable at one end side of the feeding cable, a second feeding cable holding member attached to the first moving carriage to hold a second portion of the feeding cable at an other end side of the feeding cable, and a pulley configured to be rotatable in the moving direction of the first and second moving carriages and to move integrally with the second moving carriage. A portion of the feeding cable between the first and second feeding cable holding members is wound around the pulley in a U-shape.

Objects, features, and advantages of the present invention will become apparent from the following detailed description when read in conjunction with the accompanying drawings.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
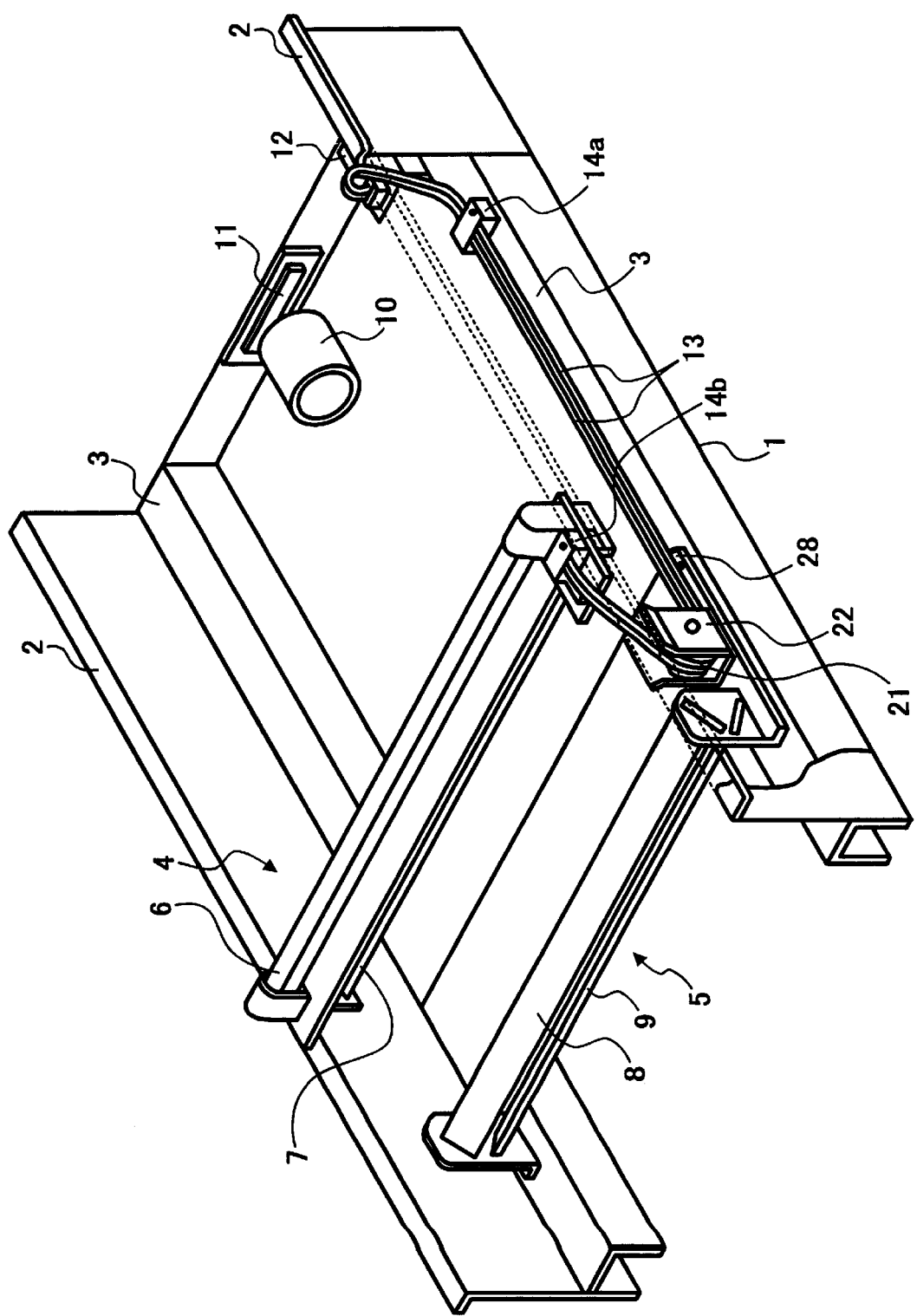
FIG. 1 is a perspective view of a main part of an image reading device according to an embodiment of the present invention.

Preferred embodiments of the present invention are described in detail referring to the drawings, wherein like reference numerals designate identical or corresponding parts throughout the several views.

FIG. 1 is a perspective view of a main part of an image reading device according to an embodiment of the present invention.

Referring to FIG. 1, in a main body case 1 of an image reading device, a pair of first rails 2 and a pair of second rails 3 are provided at a lower side of a contact glass (not shown) on which an original document is set. A first moving carriage 4 is slidably attached to the first rails 2, and a second moving carriage 5 is slidably attached to the second rails 3. A wire (not shown) driven by a motor (not shown) connects the first moving carriage 4 and the second moving carriage 5. The first moving carriage 4 and the second moving carriage 5 slidably move in the same direction via the wire at a speed ratio of two to one.

The first moving carriage 4 carries a light source 6 that irradiates an image surface of an original document set on the contacts glass with light and a first mirror 7 that reflects the light reflected from the image surface of the original document. The second moving carriage 5 carries a second mirror 8 and a third mirror 9 that reflect the light reflected from the first mirror 7. The light reflected from the third mirror 9 is imaged on a CCD (Charge Coupled Device) base board 11 serving as an image reading part through a lens 10. As an alternative example, the second moving carriage 5 may carry at least one of the second mirror 8 and the third mirror 9.

In this image reading device, a feeding cable 13 including a conductive cable whose outer circumference is covered with an insulating film, connects a regulator 12 and the light source 6. The regulator 12 serves as a voltage applying part that applies voltage to the light source 6. In this embodiment, the feeding cable 13 includes a pair of cables adjacent to each other as illustrated in FIG. 1. The number of cables included in the feeding cable 13 is not limited to two, and any number of cables such as one, three, four, etc. may be applicable.

A first feeding cable holding member 14a holds a portion of the feeding cable 13 at one end side of the feeding cable 13. The first feeding cable holding member 14a is fixedly attached to the second rail 3 in a vicinity of the regulator 12 at a position along a moving direction of the first and second moving carriages 4 and 5. A second feeding cable holding member 14b holds a portion of the feeding cable 13 at the other end side of the feeding cable 13. The second feeding cable holding member 14b is attached to the first moving carriage 4 in a vicinity of the light source 6.

Figure 2:
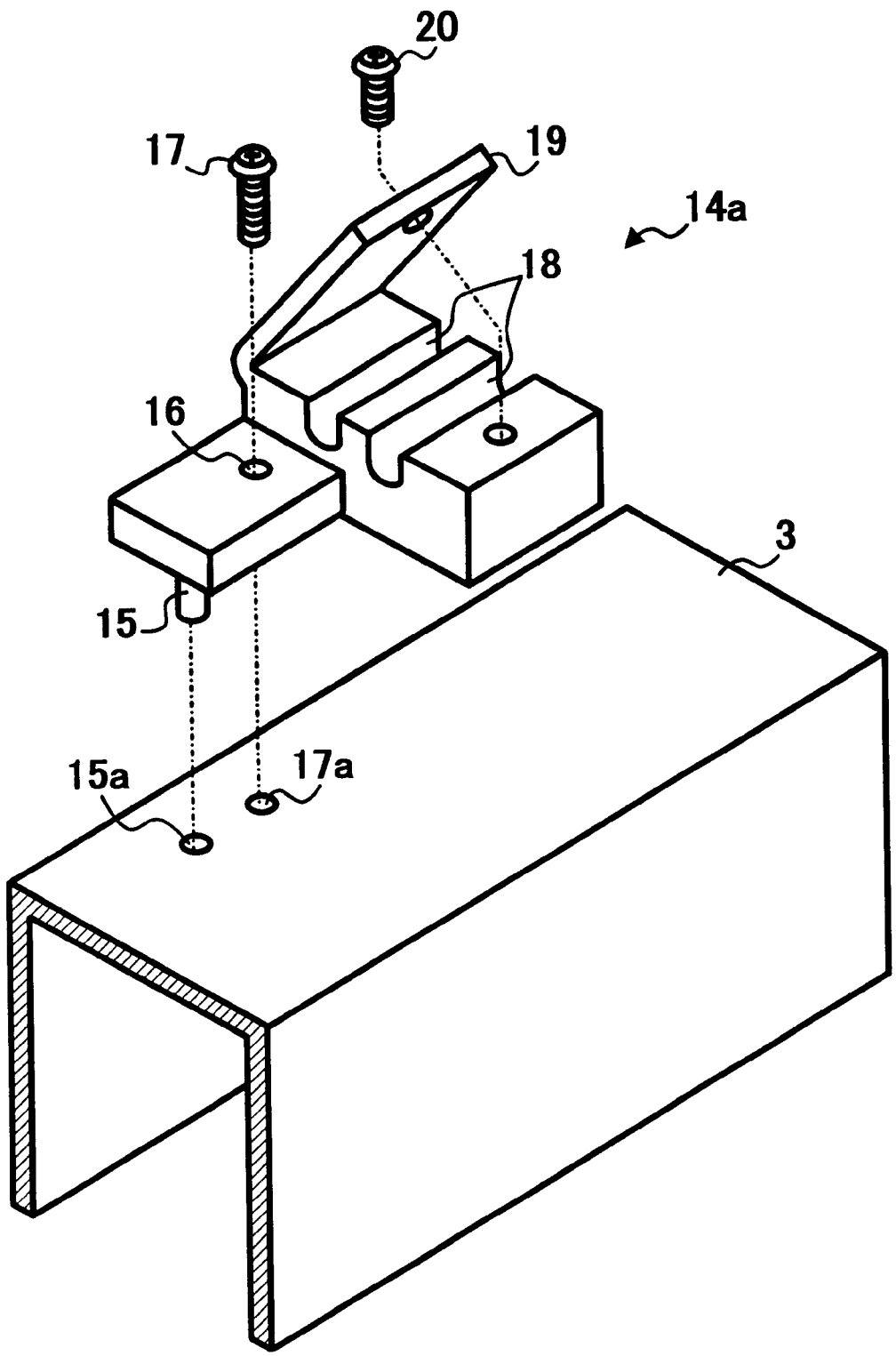
FIG. 2 is a perspective view of a feeding cable holding member and a rail for explaining an attachment of the feeding cable holding member to the rail.

The first feeding cable holding member 14a is attached to the second rail 3 as illustrated in FIG. 2. Specifically, the first feeding cable holding member 14a is attached to the second rail 3 by inserting a pin 15 formed on the first feeding cable holding member 14a into an attachment hole 15a formed in the second rail 3. Further, a pinching screw 17 passing into a hole 16 formed in the first feeding cable holding member 14a is screwed into a threaded screw hole 17a formed in the second rail 3.

The construction of the second feeding cable holding member 14b is similar to that of the first feeding cable holding member 14a, and the way of attaching the second feeding cable holding member 14b to the first moving carriage 4 is similar to the way of attaching the first feeding cable holding member 14a to the second rail 3. Therefore, detailed descriptions for the second feeding cable holding member 14b are omitted here.

The first and second feeding cable holding members 14a and 14b respectively include concave grooves 18 to engage with the feeding cable 13. As described above, the feeding cable 13 includes a pair of cables adjacent to each other, and the respective concave grooves 18 are formed so that the pair of neighboring cables engaged with the respective concave grooves 18 have a gap therebetween.

Further, the first and second feeding cable holding members 14a and 14b respectively include restraining members 19 to restrain the feeding cable 13 from disengaging from the concave grooves 18. When the respective restraining members 19 restrain the feeding cable 13 from disengaging from the concave grooves 18, the restraining members 19 are secured by pinching screws 20. With provision of the restraining members 19, the feeding cable 13 is prevented from being twisted, tangled due to a crossing, and sagging.

Figure 3A:
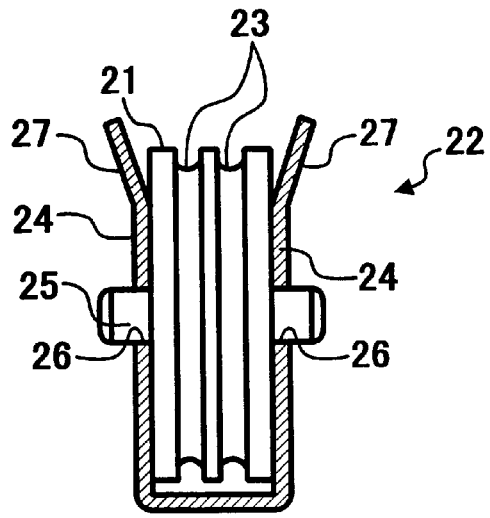
FIG. 3A is a cross-sectional view of a pulley and a pulley holding member when the pulley holding member holds the pulley.
Figure 3B:
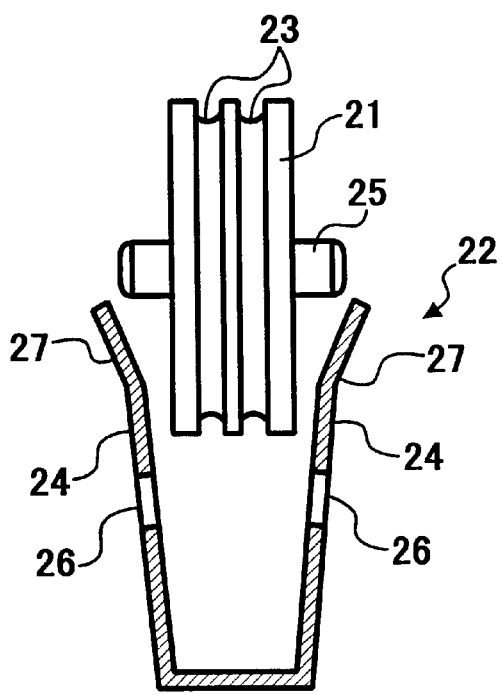
FIG. 3B is a cross-sectional view of the pulley and the pulley holding member when holding plates of the pulley holding member elastically deform for inserting the pulley into the pulley holding member.

Referring to FIG. 1, a portion of the feeding cable 13 between the first and second feeding cable holding members 14a and 14b is wound around an outer circumference of a pulley 21 in a U-shape. A pulley holding member 22 holds the pulley 21 so that the pulley 21 is rotatable in the moving direction of the first and second moving carriages 4 and 5. The pulley holding member 22 is attached to the second moving carriage 5. As illustrated in FIGS. 3A and 3B, the pulley 21 includes a ring-shaped groove 23 at an outer circumference portion thereof so as to engage with the feeding cable 13. By engaging the feeding cable 13 with the ring-shaped groove 23, the feeding cable 13 may be prevented from being twisted, and tangled due to a crossing at the time of rotation of the pulley 21.

As illustrated in FIG. 3A, the pulley holding member 22 includes a pair of holding plates 24 to hold the pulley 21 at both sides of the pulley 21 in a width direction thereof. The holding plates 24 include holes 26 with which a rotational shaft 25 of the pulley 21 is rotatably engaged. The holding plates 24 further include opening bending parts 27 bending in directions away from each other at end portions of the holding plates 24 at a side thereof where the pulley 21 is inserted between the holding plates 24 to be attached and detached from the pulley holding member 22.

The pulley holding member 22 is formed from metal or other appropriate material. The holding plates 24 of the pulley holding member 22 are elastically deformable so as to be in a position to hold the pulley 21 (illustrated in FIG. 3A) and another position to release the pulley 21 (illustrated in FIG. 3B). The pulley 21 including the rotational shaft 25 is formed from resin or other appropriate material.

Figure 4:
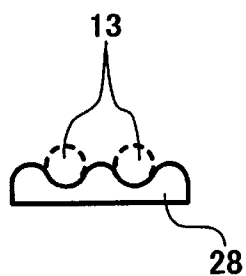
FIG. 4 is a front view of a guide member.

Referring to FIGS. 1 and 4, a guide member 28 that guides the feeding cable 13 is provided in a vicinity proximate to the pulley 21. The guide member 28 serves to prevent the feeding cable 13 from being twisted and tangled due to a crossing at the time of rotation of the pulley 21.

In the above-described construction of the image reading device according to the embodiment of the present invention, the image reading device employs the feeding cable 13 including a conductive cable whose outer circumference is covered with an insulating film as a part connecting the regulator 12 and the light source 6 to feed the voltage from the regulator 12 to the light source 6. The cost of the feeding cable 13 is lower than that of a flexible wiring board. Therefore, a manufacturing cost of the image reading device may be decreased by use of the low-cost feeding cable 13.

Figure 5:
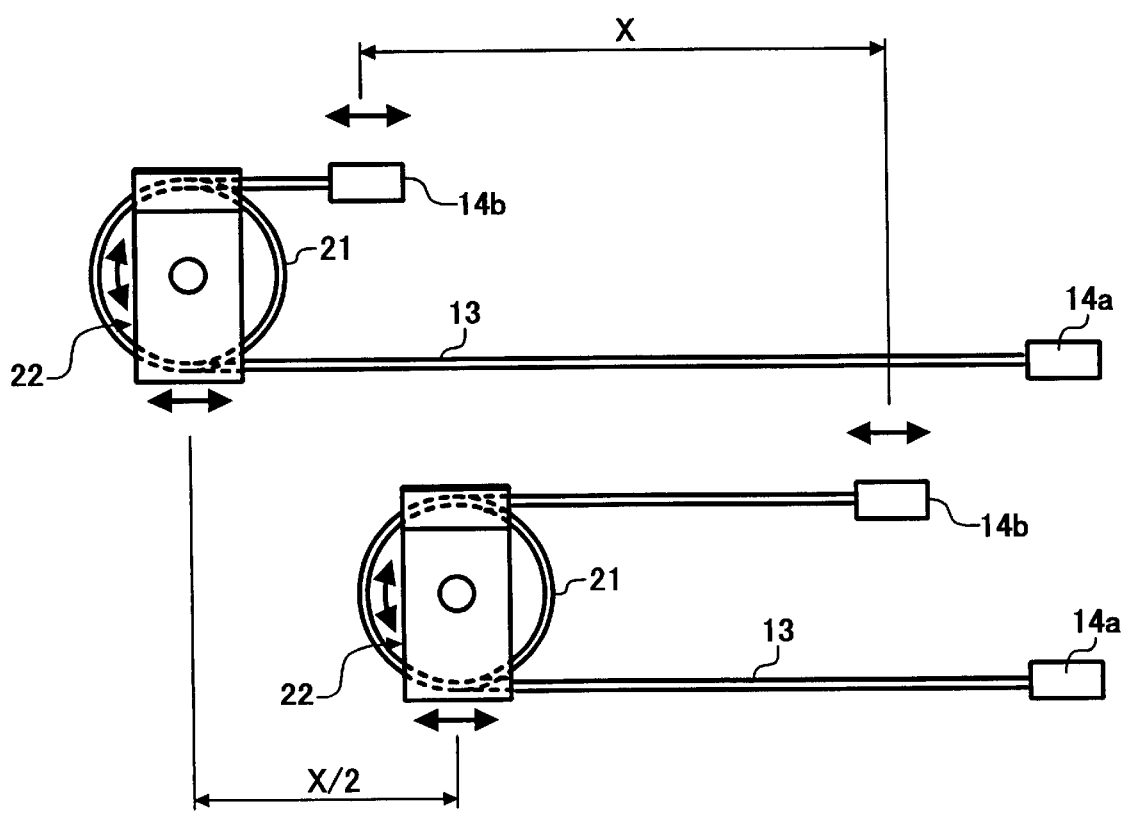
FIG. 5 is a schematic view of assistance in explaining moving status of the pulley and the feeding cable at a time of image reading.

Referring to FIG. 5, while the first moving carriage 4 and the second moving carriage 5 move at a predetermined speed ratio at a time of image reading, a portion of the feeding cable 13 at the side of the regulator 12 is fixedly held by the first feeding cable holding member 14a and a portion of the feeding cable 13 at the other end side of the feeding cable 13 is held by the second feeding cable holding member 14b and moves integrally with the first moving carriage 4.

As illustrated in FIG. 5, when the second feeding cable holding member 14b on the first moving carriage 4 moves by a distance of "X", the pulley 21 on the second moving carriage 5 moves by a distance of "X/2". In this condition, the length of the feeding cable 13 between the first and second feeding cable holding members 14a and 14b is kept constant, so that the feeding cable 13 is held under a predetermined tension. Therefore, even when the feeding cable 13 moves together with the first and second moving carriages 4 and 5 at the time of image reading, the feeding cable 13 is prevented from being twisted, tangled due to crossing, and sagging.

As described above, the pair of neighboring cables of the feeding cable 13 have a gap therebetween. With this construction, an influence of voltage waveform at a time of voltage application is avoided between the neighboring cables. In addition, the safety for leakage may be increased.

At a portion of the feeding cable 13 wound around the pulley 21 in a U-shape, the pulley 21 is rotated by moving the feeding cable 13. Therefore, no relatively large frictional force is exerted on a contact part of the feeding cable 13 and the pulley 21. As a result, it may avoid an insulation fault of the feeding cable 13 due to wear of the insulating film of the feeding cable 13 caused by the above-described frictional force. Further, the feeding cable 13 properly feeds the voltage applied from the regulator 12 to the light source 6.

As described above, the pulley holding member 22 includes the pair of elastically deformable holding plates 24. The holding plates 24 includes opening bending parts 27 bending in directions away from each other. By applying a force to the opening bending parts 27 in the direction that increases a space between the holding plates 24, the holding plates 24 are easily deformed as illustrated in FIG. 3B, thereby increasing the ease in inserting the pulley 21 into the pulley holding member 22. In addition, it may enhance the workability in arranging the feeding cable 13 under the condition in which the feeding cable 13 is wound around the pulley 21 in a U-shape.

According to the embodiment of the present invention, the pulley holding member 22 is formed from metal, and the pulley 21 including the rotational shaft 25 is formed from resin. Therefore, abrasion is minimized in the holes 26 of the pulley holding member 22 made of metal. Additionally, the abrasion of the pulley 21 may be obviated. As compared to a case if the pulley holding member 22 and the pulley 21 are formed from resin, the abrasion of resin members does occur. Further, because the pulley 21 that contacts the feeding cable 13 is formed from resin, the safety for leakage may be ensured. As one non-limiting example of the pulley holding member 22, at least a portion of the pulley holding member 22 which contacts the rotational shaft 25 of the pulley 21 may be formed from metal.

Figure 6:
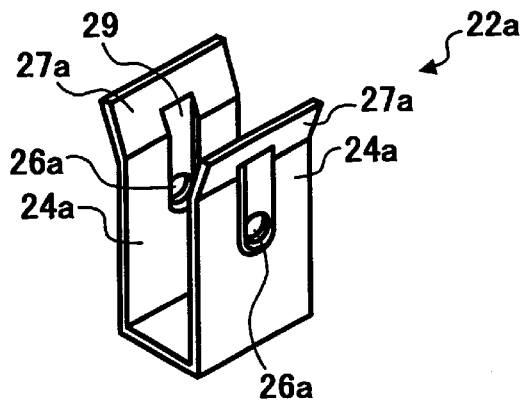
FIG. 6 is a perspective view of a pulley holding member according to an alternative example.

Next, an alternative example of the pulley holding member 22 will be described referring to FIG. 6. A pulley holding member 22a of FIG. 6 is formed from metal or other appropriate material to minimize abrasion. The pulley holding member 22a includes a pair of holding plates 24a elastically deformable so as to be in a position to hold the pulley 21 and a position to release the pulley 21. Further, guide grooves 29 are respectively formed with the holding plates 24a. The guide grooves 29 guide the rotational shaft 25 of the pulley 21 to holes 26a formed in the holding plates 24a when the pulley 21 is inserted into the pulley holding member 22a.

In the pulley holding member 22a having the above-described construction, when the pulley 21 is inserted into the pulley holding member 22a, the rotational shaft 25 of the pulley 21 is positioned at an upper end part of the guide grooves 29, and then the pulley 21 is pushed downward. The tip end portions of the rotational shaft 25 move along the guide grooves 29 while the holding plates 24a elastically deform in directions away from each other. Subsequently, the rotational shaft 25 is engaged with the holes 26a. The guide grooves 29 increase the ease in inserting the pulley 21 into the pulley holding member 22a.

Figure 7:
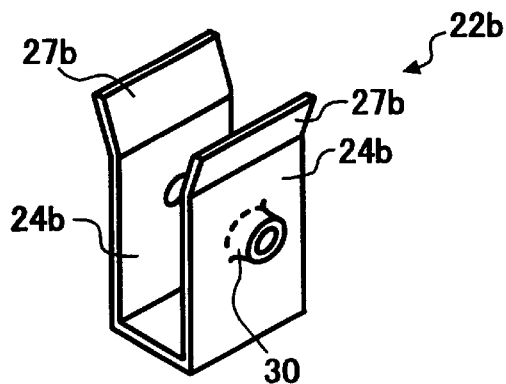
FIG. 7 is a perspective view of a pulley holding member according to another alternative example.
Figure 8:
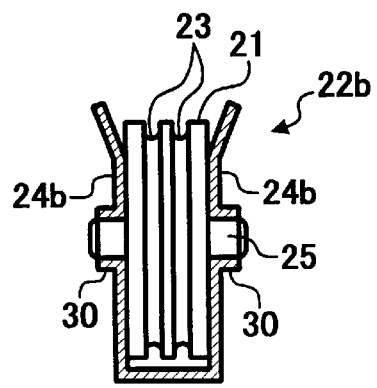
FIG. 8 is a cross-sectional view of the pulley holding member of FIG. 7 when the pulley holding member holds the pulley.

Another alternative example of the pulley holding member 22 will be described referring to FIGS. 7 and 8. A pulley holding member 22b of FIG. 7 is formed from metal. The pulley holding member 22b includes a pair of holding plates 24b elastically deformable so as to be in a position to hold the pulley 21 and a position to release the pulley 21. Further, cylindrical holding parts 30 are respectively formed with the holding plates 24b so as to hold the rotational shaft 25 of the pulley 21.

In the pulley holding member 22b having the above-described construction, when the pulley 21 is inserted into the pulley holding member 22b, the rotational shaft 25 of the pulley 21 is rotatably held by the cylindrical holding parts 30. Because the above-described construction of the pulley holding member 22b allows the contact area of the rotational shaft 25 and the cylindrical holding parts 30 at the time of rotation of the pulley 21 to increase, abrasion of a portion of the rotational shaft 25 of the pulley 21 which contacts the cylindrical holding parts 30 may be decreased. Therefore, the rotation performance of the pulley 21 may be maintained, and the useful lifetime of the pulley 21 may be extended.

Numerous additional modifications and variations of the present invention are possible in light of the above teachings. It is therefore to be understood that within the scope of the appended claims, the present invention may be practiced otherwise than as specifically described herein.

What is claimed as new and is desired to be secured by Letters Patent of the United States is:

1. An image reading device, comprising:
   a first moving carriage configured to carry a light source that irradiates an image surface of an original document with light and a first mirror that reflects the light reflected from the image surface of the original document;
   a second moving carriage configured to carry at least one of a second mirror and a third mirror that reflects the light reflected from the first mirror;
   a voltage applying part configured to apply voltage to the light source;
   a feeding cable connecting the voltage applying part and the light source, the feeding cable including a conductive cable whose outer circumference is covered with an insulating film;
   a first feeding cable holding member fixedly arranged in a vicinity of the voltage applying part at a position along a moving direction of the first and second moving carriages to hold a first portion of the feeding cable at one end side of the feeding cable;
   a second feeding cable holding member attached to the first moving carriage to hold a second portion of the feeding cable at an other end side of the feeding cable; and
   a pulley configured to be rotatable in the moving direction of the first and second moving carriages and to move integrally with the second moving carriage, wherein a portion of the feeding cable between the first and second feeding cable holding members is wound around the pulley in a U-shape.

2. The image reading device according to claim 1, wherein the first and second feeding cable holding members include concave grooves configured to engage with the feeding cable.

3. The image reading device according to claim 2, wherein the first and second feeding cable holding members include restraining members configured to restrain the feeding cable from disengaging from the concave grooves.

4. The image reading device according to claim 2, wherein the feeding cable includes plural cables adjacent to each other, and wherein the respective concave grooves are formed so that any neighboring ones of the plural cables engaged with the respective concave grooves have a gap therebetween.

5. The image reading device according to claim 1, wherein the pulley is attached to the second moving carriage.

6. The image reading device according to claim 1, further comprising a pulley holding member including a pair of holding plates configured to hold the pulley at both sides of the pulley in a width direction thereof, wherein the holding plates are elastically deformable so as to be in a first position to hold the pulley and a second position to release the pulley.

7. The image reading device according to claim 6, wherein the holding plates include opening bending parts configured to bend in directions away from each other at end portions of the holding plates at a side thereof where the pulley is inserted between the holding plates to be attached and detached from the pulley holding member.

8. The image reading device according to claim 1, further comprising a pulley holding member including a pair of holding plates configured to hold the pulley at both sides of the pulley in a width direction thereof, wherein the holding plates include cylindrical holding parts which hold a rotational shaft of the pulley.

9. The image reading device according to claim 8, wherein the holding plates include opening bending parts configured to bend in directions away from each other at end portions of the holding plates at a side thereof where the pulley is inserted between the holding plates to be attached and detached from the pulley holding member.

10. The image reading device according to claim 1, further comprising a pulley holding member including a pair of holding plates configured to hold the pulley at both sides of the pulley in a width direction thereof, wherein the pulley is formed from resin, and at least a portion of the pulley holding member which contacts a rotational shaft of the pulley is formed from metal.

11. The image reading device according to claim 1, wherein the pulley includes a ring-shaped groove at an outer circumference portion thereof configured to engage with the feeding cable.

12. The image reading device according to claim 1, wherein a guide member that guides the feeding cable is provided in a vicinity of the pulley.

13. An image reading device, comprising:
    first means for moving and carrying a light source that irradiates an image surface of an original document with light and a first mirror that reflects the light reflected from the image surface of the original document;
    second means for moving and carrying at least one of a second mirror and a third mirror that reflects the light reflected from the first mirror;
    means for applying voltage to the light source;
    means for connecting the means for applying and the light source, the means for connecting including a conductive cable having an outer circumference covered with an insulating film;
    first means for holding a first portion of the means for connecting at one end side of the means for connecting, the first means for holding being fixedly arranged in a vicinity of the means for applying at a position along a moving direction of the first and second means for moving and carrying;
    second means for holding a second portion of the means for connecting at the other end side of the means for connecting, the second means for holding being attached to the first means for moving and carrying; and
    a pulley configured to be rotatable in the moving direction of the first and second means for moving and carrying and configured to move integrally with the second means for moving and carrying, wherein a portion of the means for connecting between the first and second means for holding is wound around the pulley in a U-shape.

14. The image reading device according to claim 13, wherein the first and second means for holding include means for engaging with the means for connecting.

15. The image reading device according to claim 14, wherein the first and second means for holding include means for restraining disengagement of the means for connecting from the means for engaging.

16. The image reading device according to claim 14, wherein the means for connecting includes plural cables adjacent to each other, and wherein the respective means for engaging are formed so that any neighboring ones of the plural cables engaged with the respective means for engaging have a gap therebetween.

17. The image reading device according to claim 13, wherein the pulley is attached to the second means for moving and carrying.

18. The image reading device according to claim 13, further comprising means for holding the pulley, wherein the means for holding the pulley includes a pair of holding plates configured to hold the pulley at both sides of the pulley in a width direction thereof, and wherein the holding plates are elastically deformable so as to be in a first position to hold the pulley and a second position to release the pulley.

19. The image reading device according to claim 13, further comprising means for holding the pulley, wherein the means for holding the pulley includes a pair of holding plates configured to hold the pulley at both sides of the pulley in a width direction thereof, and wherein the holding plates include means for holding a rotational shaft of the pulley.

20. The image reading device according to claim 18, wherein the holding plates include opening bending parts configured to bend in directions away from each other at end portions of the holding plates at a side thereof where the pulley is inserted between the holding plates to be attached and detached from the means for holding the pulley.

21. The image reading device according to claim 19, wherein the holding plates include opening bending parts configured to bend in directions away from each other at end portions of the holding plates at a side thereof where the pulley is inserted between the holding plates to be attached and detached from the means for holding the pulley.

22. The image reading device according to claim 13, further comprising means for holding the pulley including a pair of holding plates configured to hold the pulley at both sides of the pulley in a width direction thereof, wherein the pulley is formed from resin, and at least a portion of the means for holding the pulley which contacts a rotational shaft of the pulley is formed from metal.

23. The image reading device according to claim 13, wherein the pulley includes means for engaging with the means for connecting at an outer circumference portion of the pulley.

24. The image reading device according to claim 13, wherein means for guiding the means for connecting is provided in a vicinity of the pulley.

* * * * *